United States Patent
Seo et al.

(10) Patent No.: US 11,450,913 B2
(45) Date of Patent: Sep. 20, 2022

(54) BATTERY PACK HAVING CRASH BEAM AND DRAIN STRUCTURE

(71) Applicant: LG CHEM, LTD., Seoul (KR)

(72) Inventors: Sung-Won Seo, Daejeon (KR);
Jeong-O Mun, Daejeon (KR);
Yoon-Koo Lee, Daejeon (KR);
Ho-June Chi, Daejeon (KR); Dal-Mo Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 422 days.

(21) Appl. No.: 16/349,530

(22) PCT Filed: Mar. 26, 2018

(86) PCT No.: PCT/KR2018/003527
§ 371 (c)(1),
(2) Date: May 13, 2019

(87) PCT Pub. No.: WO2018/186616
PCT Pub. Date: Oct. 11, 2018

(65) Prior Publication Data
US 2020/0185672 A1     Jun. 11, 2020

(30) Foreign Application Priority Data
Apr. 4, 2017   (KR) .......................... 10-2017-0043912

(51) Int. Cl.
*H01M 50/20*    (2021.01)
*H01M 10/613*   (2014.01)
(Continued)

(52) U.S. Cl.
CPC ............. *H01M 50/20* (2021.01); *B60L 50/66* (2019.02); *B60L 58/26* (2019.02);
(Continued)

(58) Field of Classification Search
CPC ........... H01M 10/625; H01M 10/6557; H01M 10/6568; H01M 2200/20; B60L 50/66; B60L 58/26
See application file for complete search history.

(56) References Cited

U.S. PATENT DOCUMENTS 7,605,562 B2   10/2009  Kim
8,293,397 B2   10/2012  Uchida et al.
(Continued)

FOREIGN PATENT DOCUMENTS

CN     105552268 B  *  5/2016
JP        7-52659 A     2/1995
(Continued)

OTHER PUBLICATIONS

Machine translation of KR101690234B1 with examiner annotated paragraph numbering (Year: 2015).*
(Continued)

*Primary Examiner* — Milton I Cano
*Assistant Examiner* — Mary G Henshaw
(74) *Attorney, Agent, or Firm* — Birch, Stewart, Kolasch & Birch, LLP (57) ABSTRACT

A battery pack including a plurality of battery modules; a tray including an interior space where the plurality of battery modules are positioned; a plurality of beam frames traversing an upper surface of the tray to partition spaces where the plurality of battery modules are positioned; and a plurality of heatsinks having a hollow structure through which a coolant flows, wherein each heatsink is coupled to a part of a respective one of the plurality of beam frames and faces a side surface of a respective one of the plurality of battery modules, at least one drainage hole is provided at the tray and at least one drainage hole is provided at the beam frame, and the at least one drainage hole of the tray and the at least (Continued)

one drainage hole of the beam frame are provided below the heatsink.

16 Claims, 6 Drawing Sheets

(51) Int. Cl.
*H01M 10/625* (2014.01)
*H01M 10/647* (2014.01)
*H01M 10/6557* (2014.01)
*H01M 10/6568* (2014.01)
*B60L 50/60* (2019.01)
*B60L 58/26* (2019.01)

(52) U.S. Cl.
CPC ....... *H01M 10/613* (2015.04); *H01M 10/625* (2015.04); *H01M 10/647* (2015.04); *H01M 10/6557* (2015.04); *H01M 10/6568* (2015.04); *H01M 2220/20* (2013.01)

(56) References Cited

U.S. PATENT DOCUMENTS

| | | | |
|---|---|---|---|
| 9,159,970 | B2 | 10/2015 | Watanabe et al. |
| 2013/0266840 | A1 | 10/2013 | Fujii et al. |
| 2016/0126536 | A1 | 5/2016 | Cho et al. |
| 2017/0012330 | A1 | 1/2017 | Kim et al. |

FOREIGN PATENT DOCUMENTS

| | | | |
|---|---|---|---|
| JP | 2009-54403 | A | 3/2009 |
| JP | 2009-176464 | A | 8/2009 |
| JP | 2010-92598 | A | 4/2010 |
| JP | 4494719 | B2 | 6/2010 |
| JP | 2013004341 | A * | 1/2013 |
| JP | 2014-26825 | A | 2/2014 |
| KR | 10-0612305 | B1 | 8/2006 |
| KR | 10-2012-0034027 | A | 4/2012 |
| KR | 10-2012-0069238 | A | 6/2012 |
| KR | 10-2015-0099965 | A | 9/2015 |
| KR | 10-1690234 | B1 | 12/2016 |

OTHER PUBLICATIONS

Machine translation of JP2013004341A (Year: 2013).*
Translated abstract for CN-105552268-B (Year: 2016).*
European Search Report for Application No. 18780297.0 dated Feb. 5, 2020.
International Search Report issued in PCT/KR2018/003527 (PCT/ISA/210), dated Jul. 2, 2018.

* cited by examiner

BATTERY PACK HAVING CRASH BEAM AND DRAIN STRUCTURE

TECHNICAL FIELD

The present disclosure relates to a battery pack, and more particularly, to a battery pack having a space-efficient loading structure for battery modules and a drain structure for preventing a leaked coolant from flowing into the battery modules. The present application claims priority to Korean Patent Application No. 10-2017-0043912 filed on Apr. 4, 2017 in the Republic of Korea, the disclosures of which are incorporated herein by reference.

BACKGROUND ART

Unlike a primary battery which is not rechargeable, a secondary battery refers to a battery capable of charging and discharging and is used as a power source for an energy storage system (ESS), an electric vehicle (EV) or a hybrid electric vehicle (HEV) as well as small advanced electronic devices such as a mobile phone, a PDA and a notebook computer.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

For example, when a plurality of battery cells are connected in series or in parallel to configure a battery pack, it is common to configure a battery module composed of a plurality of battery cells first, and then configure a battery pack by using a plurality of battery modules and adding other components. In other words, the battery module refers to a component where a plurality of secondary batteries are connected in series or in parallel, and the battery pack refers to a component where a plurality of battery modules are connected in series or in parallel to increase capacity and output.

Meanwhile, in a battery pack of a multi battery module structure, it is important to easily discharge heat generated from each battery module. If the heat of the battery module generated during charging and discharging is not effectively removed, heat accumulation may occur, resulting in deterioration of the battery module and causing ignition or explosion. Thus, a high-output large-capacity battery pack essentially requires a cooling device for cooling the battery modules included therein.

Generally, the cooling method of a battery pack is classified into an air cooling type and a water cooling type, and the water cooling type is more preferable because it has less noise and better cooling performance in comparison to the air cooling type. For example, in the water cooling type, a heatsink having a flow path through which a coolant may flow is brought into contact with a bottom or a side of the battery module to absorb heat from the battery module.

However, in the case of a battery pack adopting the water cooling type, if the heatsink is broken, the coolant may flow into the battery module, which may increase the risk of leakage. Also, even though the battery module is well waterproofed, if the battery pack is left in the sealed case of the battery pack for a long time in a state where the coolant stagnates in the case, the humidity inside the pack case becomes very high, which does not ensure no possibility of short circuit.

In addition, in the case of an electric vehicle, unexpected shocks and vibrations may be applied to the battery pack during operation. In this case, the electrical connection between the battery modules may be broken, or the pack case supporting the battery modules may be deformed. Thus, in particular, the battery pack for an electric vehicle is required to have sufficient durability against external shocks and vibrations. To solve this problem, a crash beam is often used to increase the mechanical stiffness of the battery pack. Here, the crash beam refers to a beam-like structure that is installed at a tray constituting the battery pack case to enhance the rigidity of the tray. The tray including the crash beam has a high impact resistance and is not easily deformed by external shocks or vibrations.

However, even though the mechanical rigidity of the battery pack is improved by installing the crash beam, in this case, the space available for loading battery modules is reduced as much. Further, if the essential cooling device configuration such as a heatsink is further added, the volume ratio or the energy density of the battery pack including the heatsink is lowered.

DISCLOSURE

Technical Problem

The present disclosure is designed to solve the problems of the related art, and therefore the present disclosure is directed to providing a battery pack, which has enough durability against external shock and vibration, is capable of accommodating battery modules and a cooling device with excellent space efficiency, and has a drain structure to cope with a case where a coolant leaks.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising: a plurality of battery modules; a tray including an interior space where the plurality of battery modules are positioned; a plurality of beam frames traversing an upper surface of the tray to partition spaces where the plurality of battery modules are positioned; and a plurality of heatsinks having a hollow structure through which a coolant flows, wherein each heatsink is coupled to a part of a respective one of the plurality of beam frames and faces a side surface of a respective one of the plurality of battery modules, wherein at least one drainage hole is respectively provided at the tray and at least one drainage hole is provided at the beam frame and wherein the at least one drainage hole of the tray and the at least one drainage hole of the beam frame are provided below the heatsink.

Each heat sink may comprise a drainage path having a concave shape.

The at least one drainage hole of the tray may be provided in plural and the at least one drainage hole of the beam frame is provided in plural, and the plurality of drainage holes of the tray and of the beam frame may be provided along the drainage paths at predetermined intervals.

Each drainage path may be inclined in at least one direction.

A first part of the plurality of beam frames may be I-type beam frames has a column and recessed portions formed at both sides of the column, and each heatsink may be mounted to a respective recessed portion of a respective I-type beam frame.

Each heatsink may have a shape corresponding to a shape of the recessed portion and be adhered to the respective recessed portion by a thermal conductive adhesive.

A second part of the plurality of beam frames, different from the first part, may be a single center frame that traverses a center position of the tray, and the I-type beam frames may intersect the center frame and be disposed on the tray at regular intervals, and the plurality of battery modules are arranged in a 2×N matrix.

Each of the heatsinks may have an input port and an output port provided respectively at a first end and a second end of the heatsink to provide coolant flow through the heatsink, the input port and the output port traversing the upper surface of the tray along the respective I-type beam frame through the center frame.

The battery pack may further comprise a pack cover covering the upper surface of the tray and two side frames covering both side surfaces of the tray, respectively, and the two side frames may be provided in the form of a manifold tube communicating with the input ports and the output ports of the heatsinks to form a path for supplying and discharging the coolant.

The center frame may be provided in the form of an angled tube having a plurality of holes formed at an outer side surface of the center frame, and a connecting module may be provided in the center frame to connect the plurality of battery modules in series and/or in parallel.

A part of the plurality of beam frames may be an angled beam frame with a hollow therein, and each heatsink may be located inside a respective angled beam frame.

The battery pack may further comprise a heat conduction medium interposed at a thermal interface between each heatsink and the respective battery module.

Each heat conduction medium may have a plate surface attached to one surface of the heatsink and at least one protrusion extending from the plate surface, and the protrusion may elastically deform when an external pressure is applied thereto.

Each heat conduction medium may be made of a silicon rubber.

In another aspect of the present disclosure, there is also provided an electric vehicle, comprising the battery pack defined above. The vehicle may include an electric vehicle (EV) and a hybrid electric vehicle (HEV).

Advantageous Effects

According to an embodiment of the present disclosure, the stiffness and volume ratio of the battery pack may be increased by coupling the beam frame and the heatsink in a space efficient manner, and the cooling configuration for the individual battery modules may be compactly implemented.

In addition, according to another embodiment of the present disclosure, by providing a drain structure to the beam frame and the tray, even though a coolant leaks from the heatsink, the coolant may be easily discharged from the battery pack.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

That is, the embodiments described in the specification and depicted shown in the drawings are only the most preferred embodiments of the present disclosure and do not represent all the technical ideas of the present disclosure, and thus it should be understood that there may be various equivalents and variations capable of replacing the embodiments at the time of this application.

Figure 1:
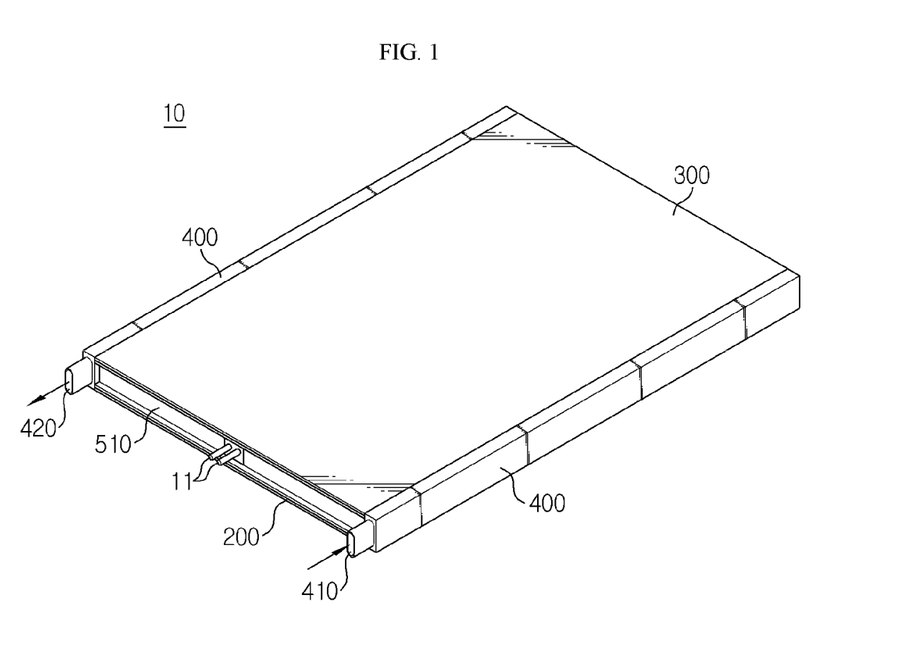
FIG. 1 is a schematic perspective view showing a battery pack according to an embodiment of the present disclosure.
Figure 2:
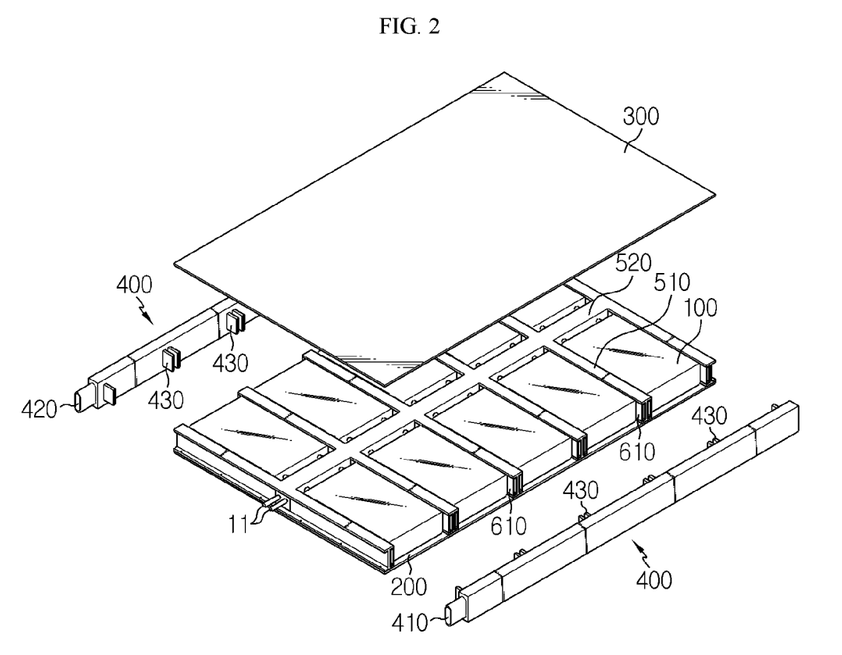
FIG. 2 is an exploded perspective view of FIG. 1.
Figure 3:
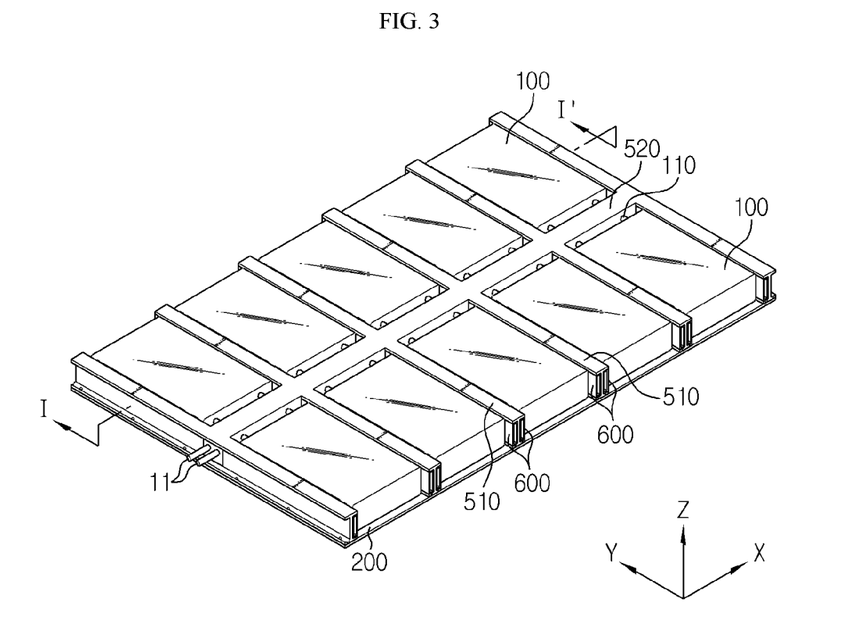
FIG. 3 is a perspective view showing a tray at which a plurality of battery modules of FIG. 2 are loaded.
Figure 4:
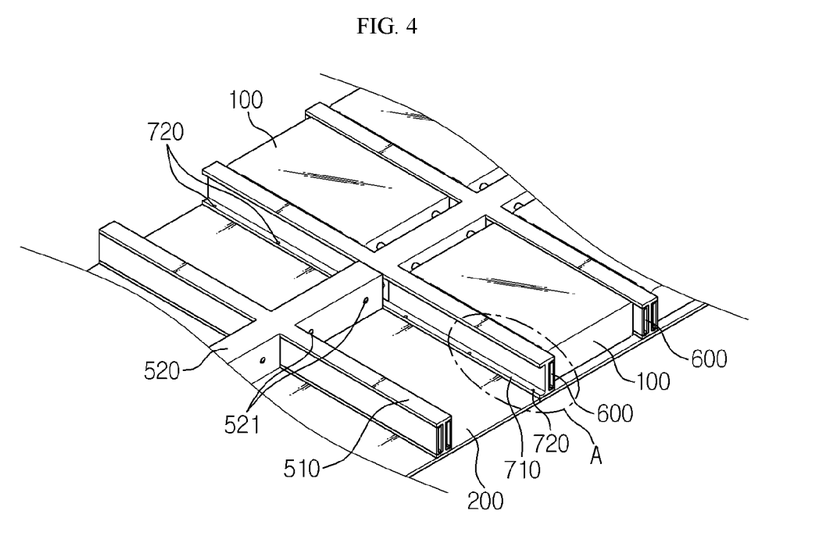
FIG. 4 is a diagram partially showing a drainage path and drainage holes of the battery pack according to an embodiment of the present disclosure.

FIG. 1 is a schematic perspective view showing a battery pack according to an embodiment of the present disclosure, FIG. 2 is an exploded perspective view of FIG. 1, FIG. 3 is a perspective view showing a tray at which a plurality of battery modules of FIG. 2 are loaded, and FIG. 4 is a diagram partially showing a drainage path 710 and drainage holes 720 of the battery pack according to an embodiment of the present disclosure.

First, referring to FIGS. 1 and 2, the battery pack 10 according to an embodiment of the present disclosure includes a plurality of battery modules 100, and a pack case accommodating the battery modules 100. The pack case may include a tray 200 giving a space where the plurality of battery modules 100 are placed, a pack cover 300 for packaging and accommodating the plurality of battery modules 100 together with the tray 200, and two side frames 400.

A plurality of battery cells are stacked in the battery module 100, and the battery module 100 may further include various other components. For example, the battery cell may be a pouch-type secondary battery, and a plurality of battery cells may be provided and electrically connected to each other.

Though not shown in the figures, each battery cell may include various components such as an electrode assembly, a battery case accommodating the electrode assembly, and an electrode lead protruding out of the battery case and electrically connected to the electrode assembly. The electrode lead may include a positive electrode lead and a negative electrode lead. Here, the positive electrode lead may be connected to a positive electrode plate of the electrode assembly, and the negative electrode lead may be connected to a negative electrode plate of the electrode assembly.

The battery module 100 may further include stacking frames and a module end plate for stacking and protecting the pouch-type secondary battery.

The stacking frames are used for stacking secondary batteries and hold the secondary batteries not to be moved. The stacking frames are provided to be stacked one another to serve as a guide for assembling the secondary batteries. For reference, the stacking frames may be replaced by various other terms such as cell covers or cartridges.

The module end plate is an element for protecting and fixing the battery cell stack and may mean an angled structure surrounding the outer periphery of the battery cell stack or a plate-like structure padded on at least one surface of the battery cell stack. The module end plate is preferably made of a metal material with high mechanical rigidity and excellent thermal conductivity.

Though not shown for the sake of convenience, the battery module 100 may further include cooling pins interposed between the battery cells. The cooling fins are thin members with thermally conductive, such as aluminum, and have ends extending outward to connect to other heat absorbing media, such as a heatsink 600, to transfer the heat of the battery cells to the outside.

As described above, the battery module 100 may refer to a collection of a plurality of battery cells or a collection of a plurality of battery cells and other components for stacking and protecting the plurality of battery cells. In addition, the battery pack 10 of the present disclosure may refer to a collection including a plurality of unit battery modules 100.

Referring to FIGS. 2 and 3, the battery pack 10 according to this embodiment is formed using ten unit battery modules 100 in total. The unit battery modules 100 may be loaded on the upper surface of the tray 200 in a 2×5 matrix form and be packaged by the pack cover 300 and two side frames 400.

The tray 200 and the pack cover 300 may be formed in a plate shape having an approximately large area and may be disposed at the lower and upper portions of the battery modules 100, respectively, to cover the lower and upper portions of the battery modules 100. In addition the two side frames 400 may be located at both side surfaces of the tray 200 to cover both side surfaces of the battery modules 100.

In particular, two side frames 400 of this embodiment may be provided in the form of a manifold tube. In more detail, seeing FIG. 2, the two side frames 400 have a passageway formed therein to serve as a pipe and have an inlet 410 or an outlet 420 formed at the outer portion thereof and a plurality of connectors 430 respectively connectable to input ports 610 and output ports (located at a side opposite to the input ports) of the heatsinks 600, explained later. The two side frames 400 serve to distribute the coolant to the heatsinks 600 or to collect the coolant from the heatsinks 600. That is, the two side frames 400 may be regarded as components of the pack case and form supply and discharge paths of the coolant into or out of the battery pack 10.

The pack case, namely the tray 200, the pack cover 300 and the two side frames 400, may give mechanical support for the battery modules 100 and protect the battery modules 100 from external impacts. Thus, the tray 200, the pack cover 300, and the two side frames 400 of the pack case may be made of metal material such as steel to ensure rigidity.

Referring to FIGS. 3 to 6 mainly, the battery pack 10 according to the present disclosure includes a plurality of beam frames installed to traverse the upper surface of the tray to partition spaces in which a plurality of battery modules may be individually placed, and a plurality of heatsinks having a hollow structure through which the coolant may flow and selectively coupled to a part of the plurality of beam frames to face the side surface of each battery module.

In this embodiment, some of the plurality of beam frames are I-type beam frames 510, and some of the plurality of beam frames are beam frames with an angled tube form. Hereinafter, the beam frame in the form of an angled tube will be referred to as a center frame.

More specifically, in this embodiment, as shown in FIG. 3, six I-type beam frames 510 may be arranged at regular intervals along the vertical direction (the X-axis direction) of the tray 200, and one center frame 520 may be arranged to cross the six I-type beam frames 510 and traverse the center of the tray 200. At this time, the interval between two I-type beam frames 510 corresponds to the width of the unit battery module 100, and the height of the I-type beam frame 510 may be equal to or higher than the height of the battery module 100. Thus, partitioned individual accommodation spaces in which ten unit battery modules 100 may be loaded in a 2×5 matrix form may be formed on the tray 200.

Each unit battery module 100 may be placed in the individual accommodation space so that the module electrode terminals 110 thereof face the center frame 520. At this time, both side surfaces of the unit battery module 100 may be supported two I-type beam frames 510 so that the unit battery module 100 is not moved.

Though not shown in detail for convenience, a plurality of holes 521 may be formed in the outer surface of the center frame 520 along the length direction (the X-axis direction). In addition, a connecting module (not shown) may be provided inside the center frame 520.

Two unit battery modules 100 are provided in each row, and the module electrode terminals 110 thereof may be inserted into the holes 521 of the center frame 520 to face each other and are connected to the connecting module.

The connecting module may be composed of bus bars made of electrically conductive material and forming a serial and/or parallel network. The connecting module may connect the plurality of battery modules 100 in series and/or in parallel. In addition, the connecting module may be connected to a terminal 11 of the battery pack 10 located at an outer side of the front surface of the tray 200, and the terminal 11 may be electrically connected to another device outside the battery pack 10.

According to the 2×N matrix arrangement of the battery modules 100 and the configuration of the I-type beam frames 510 and the center frame 520, it is possible to easily fix and load the battery modules 100, and it is possible to enhance the mechanical stiffness of the tray 200. In addition, it is possible to simplify the wiring structure without exposing a high-voltage cable or the like on the tray 200. Accordingly, the safety and space utilization of the battery pack 10 may be improved.

Figure 5:
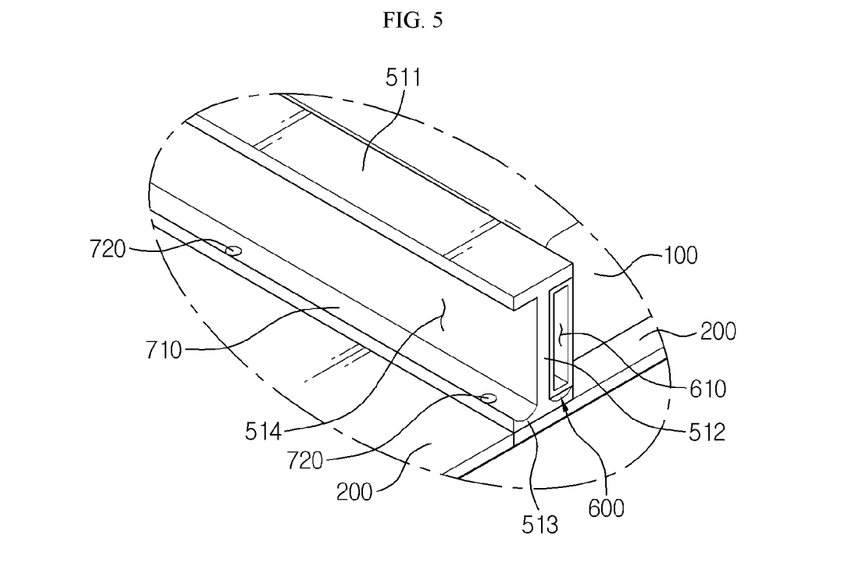
FIG. 5 is an enlarged view showing a portion A of FIG. 4.
Figure 6:
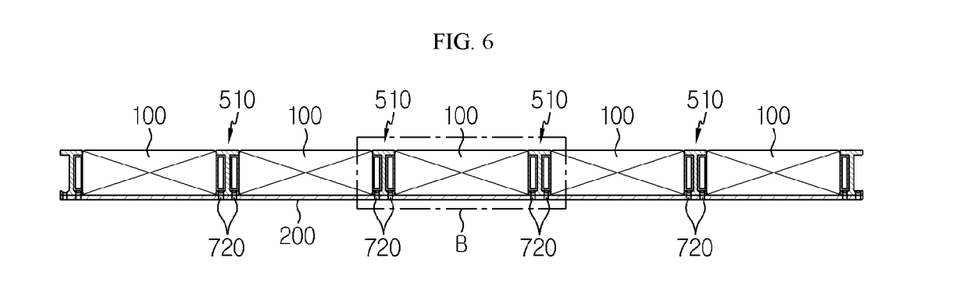
FIG. 6 is a cross-sectional view, taken along the line I-I' of FIG. 3.

Referring to FIG. 5, the I-type beam frame 510 according to the present disclosure includes a top portion 511 and a bottom portion 513, which are horizontal with respect to the upper surface of the tray 200, and a column 512, which vertically connects the centers of the top portion 511 and the bottom portion 513 to form the height of the I-type beam frame 510.

The spaces of the I-type beam frame 510 between the top portion 511 and the bottom portion 513 is divided into two parts by the column 512. Hereinafter, both the divided spaces, namely the spaces formed at both sides of the column 512, will be defined as recessed portions 514. The heatsink 600 is mounted in the recessed portion 514 of the I-type beam frame 510. Here, the heatsink 600 may refer to an object that absorbs and emits heat from other objects by thermal contact.

More specifically, the heatsink 600 according to the present disclosure is manufactured to have a shape corresponding to the recessed portion 514 of the I-type beam frame 510, and the input port 610 and the output port through which the coolant flows in and out are positioned at one end and the other end thereof. Also, the heatsink 600 has a hollow structure including a flow path therein. Each heatsink 600 may extend through the center frame 520 from one side of the tray 200 to the other side thereof along each I-type beam frame 510.

The coolant flowing in the flow path of the heatsink 600 is not particularly limited as long as it easily flows in the flow path and has excellent cooling ability, but for example, it may be water that is capable of maximizing cooling efficiency due to high latent heat.

The heatsink 600 may be integrated with the I-type beam frame 510. For example, the heatsink 600 and the I-type beam frame 510 are simply integrated by applying a thermally conductive adhesive to the inner surface of the I-type beam frame 510 and then inserting and adhering the heatsink 600 to the recessed portion 514 of the I-type beam frame 510. In this case, the space utilization of the tray 200 may be increased compared to the case where the heatsink 600 is provided at a separate position.

Figure 7:
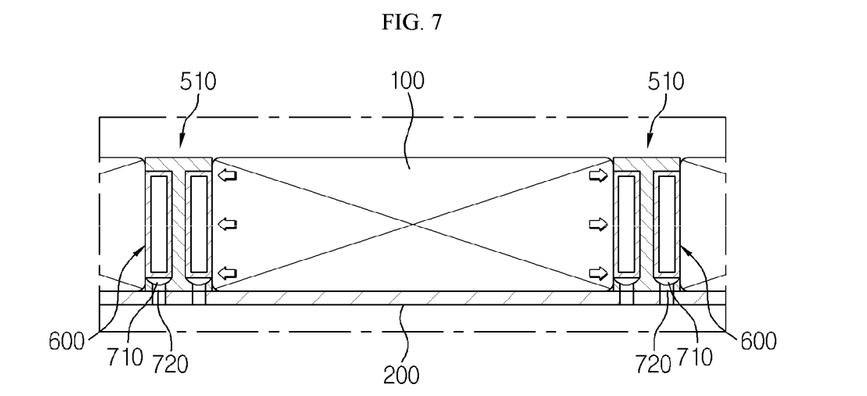
FIG. 7 is an enlarged view showing a portion B of FIG. 6.

That is, as shown in FIG. 7, in the battery pack 10 of the present disclosure, one I-type beam frame 510 and two heatsink 600 may be combined with the corresponding shapes so that the space between the I-type beam frames 510 may be entirely utilized as a space for individually mounting the unit battery module 100, and the heat generated from each battery module 100 may be dissipated to both side surfaces of the battery module 100. In addition, since the I-type beam frame 510 may also be cooled by the heatsink 600, it is possible to prevent the I-type beam frame 510 from being deformed due to the temperature rise, thereby more effectively controlling the heat of the entire battery pack structure.

In addition, the battery pack 10 according to the present disclosure may further include a drainage path 710 formed at the lower portion of the heatsink 600 and drainage holes 720 provided at regular intervals along the drainage path 710. The drainage path 710 and the drainage holes 720 are components for discharging a coolant, which is leaked due to breakage of the heatsink 600, out of the battery pack 10.

Referring to FIGS. 4 and 5 again, the drainage path 710 of this embodiment may be formed at the bottom portion 513 of the I-type beam frame. For example, the bottom portion 513 of the I-type beam frame may be concavely rounded to form the drainage path 710. The drainage path 710 may be inclined at least in one direction. For example, though not shown in the figures, the drainage path 710 may be inclined toward both ends of the tray 200 from the center of the tray 200, or may be inclined from one end of the tray 200 toward the other end thereof.

The drainage hole 720 may be provided in plural at predetermined intervals along the drainage path 710. For example, the bottom portion 513 of the I-type beam frame and specific locations of the tray 200 may be tapped to form the drainage holes 720 in a vertically-perforated shape.

The drainage path 710 and the drainage holes 720 may be provided with the same pattern at the I-type beam frames 510, where the heatsinks 600 are located, and the trays 200 at the corresponding positions.

If the drainage path 710 and the drainage holes 720 are provided, when a coolant leaks from the heatsink 600, the coolant may flow down the wall of the heatsink 600 and be collected in the concave space of the drainage path 710. The collected leaked coolant may flow down along the inclined drainage path 710 and be discharged below the tray 200 through the drainage holes 720 close thereto. In general, in the case of a battery pack for an electric vehicle, considering the fact that the battery pack is mounted to a lower chassis of the vehicle, the coolant discharged below the tray 200 of the battery pack may mostly drop to the ground directly.

By providing the drain structure in the battery pack, even though a coolant leaks from the heatsink 600, the coolant may flow out of the battery pack 10, thereby eliminating the risk of short circuit.

Figure 8:
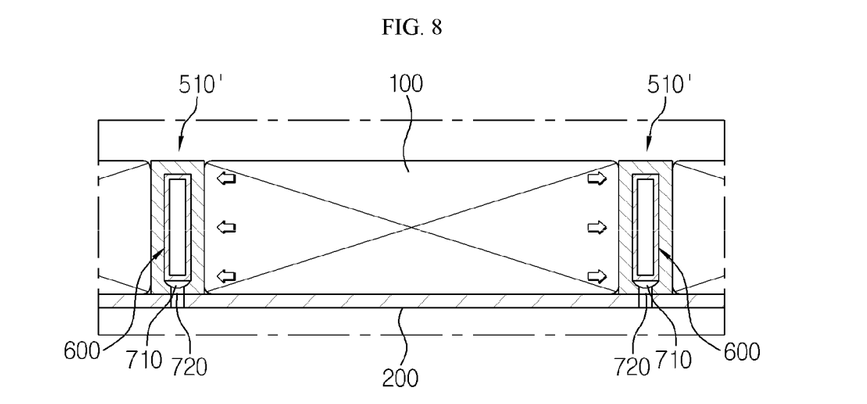
FIG. 8 is a diagram showing a modified example of the beam frame of FIG. 7.

Subsequently, with reference to FIG. 8, a modified example of the beam frame according to this embodiment and a drain structure thereof will be described. The modified example of the present disclosure to be described below may be regarded as corresponding to the embodiment of FIG. 7. The same reference numerals denote the same components and will not be described in detail.

In this modified example, a hollow angled beam frame 510' is provided as an alternative to the I-type beam frame 510 of the former embodiment. In addition, the heatsink 600 is positioned within the angled beam frame 510'. In this case, since the heatsink 600 is positioned inside the angled beam frame 510', the space utilization in the tray 200 may be improved. The drainage path 710 and the drainage hole 720 are similar to the former embodiment. In other words, the concave drainage path 710 may be formed at the lower end of the angled beam frame 510', and the plurality of drainage holes 720 may be formed along the length direction of the drainage path 710.

Meanwhile, even though the angled beam frame 510' and the heatsink 600 are structurally distinguished in the above description, a flow path may be formed inside the hollow angled beam frame as an example. Thus, the angled beam frame may be as the heatsink by itself. In this case, the angled beam frame may be regarded as a structure, and the heatsink may be regarded as a coolant flowing in the flow path inside the angled beam frame. In addition, the drainage path 710 and the drainage hole 720 may be located at the corresponding tray 200 where the angled beam frame 510' is located.

Figure 9:
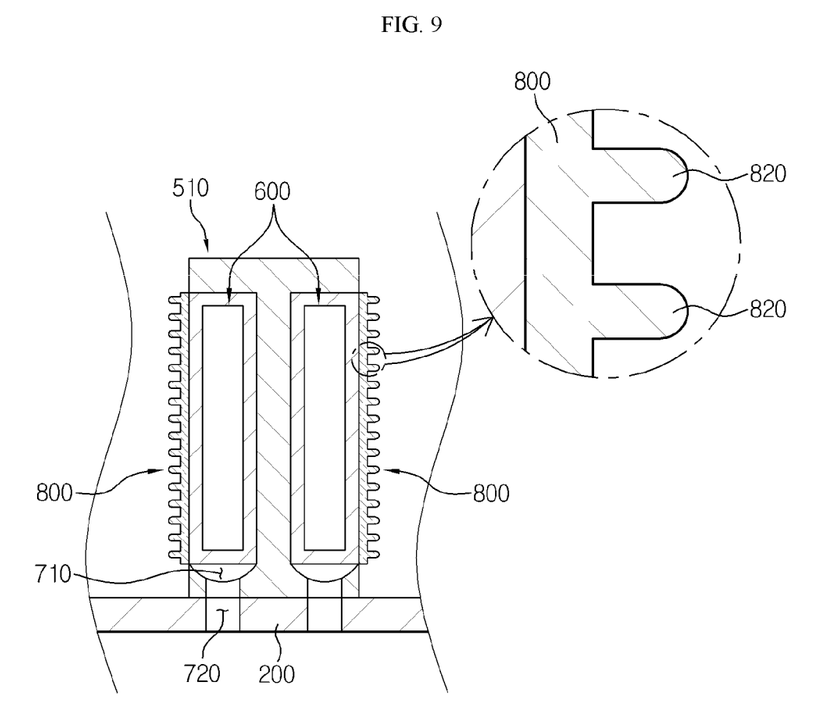
FIGS. 9 and 10 are diagrams showing states of the battery pack according to another embodiment of the present disclosure before and after the heat conduction medium makes contact with the battery modules.
Figure 10:
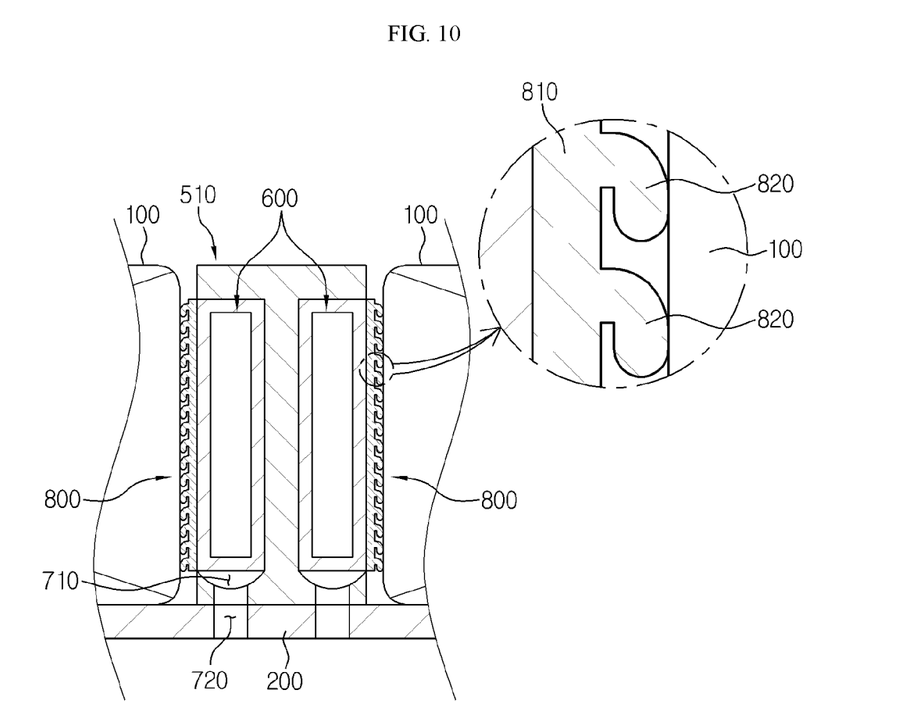

FIGS. 9 and 10 are diagrams showing states of the battery pack according to another embodiment of the present disclosure before and after the heat conduction medium makes contact with the battery modules.

The battery pack according to another embodiment of the present disclosure may further include a heat conduction medium 800 interposed at a thermal interface of the heatsink 600 and the battery module 100.

The heat conduction medium 800 may not be particularly limited in its thickness and structure as long as it is a thin member having thermal conductivity and is capable of filling the gap between the battery module 100 and the heatsink 600. For example, a sheet-shaped plate made of a metal material may be used. The metal material may be aluminum or aluminum alloy having high thermal conductivity and light weight among metals, but is not limited thereto. For example, copper, gold and silver may be used. In addition to the metal, ceramic materials such as aluminum nitride and silicon carbide are also possible.

In particular, the heat conduction medium 800 according to another embodiment of the present disclosure may include a plate surface 810 attached to one surface of the heatsink 600 and a protrusion 820 protruding perpendicularly with respect to the plate surface 810. The protrusion 820 may be made of, for example, silicone rubber that is elastically deformed when an external pressure is applied thereto. The silicone rubber has excellent thermal conductivity and heat dissipation properties and also allows elastic deformation.

As an alternative of the silicon rubber, a carbon flake or filler rubbers filled with a solution in which a highly conductive metal flake is mixed may also be applied.

In the heat conduction medium 800, when the unit battery module 100 is placed in a lower direction in the accommodation space between the I-type beam frames 510, the protrusion 820 is pressed by the side surface of the battery module 100 and thus bent downwards as shown in FIG. 10. At this time, since the protrusion 820 has an elastic restoring force to return to its original shape, the heat conduction medium 800 may strongly contact the side surface of the battery module 100. Accordingly, if the unit battery module 100 is inserted into the accommodation space, the left and right side surfaces of the battery module 100 are respectively kept in close contact with the heat conduction medium 800 as described above, so that the heat is easily transferred from the battery module 100 to the heatsink 600.

In addition, the heat conduction medium 800 may serve to hold the battery module 100. In other words, since the protrusions 820 of two heat conduction medium 800 serve to hold the battery module 100 at both side surfaces of the battery module 100, even though an external shock is applied to the battery pack 10, it is prevented that the battery module 100 is moved, and thus it is also possible to prevent a gap from being created between the battery module 100 and the heatsink 600.

As described above, according to the present disclosure, the stiffness and volume ratio of the battery pack 10 may be increased, and the cooling configuration for the individual battery module 100 may be compactly implemented. In addition, the contacting force of the individual battery module 100 to the heatsink 600 may be enhanced by using the heat conduction medium 800 having a protrusion shape and capable of elastic deformation. Accordingly, the cooling efficiency may be improved, and the individual battery modules 100 may be stably supported even though an external shock or vibration is applied thereto.

Meanwhile, the battery pack according to an embodiment of the present disclosure may further include various devices (not shown) such as a battery management system (BMS), a current sensor, a fuse and the like, for controlling charge and discharge of the battery modules.

The vehicle according to the present disclosure may include the battery pack according to the present disclosure. The battery pack may be applied not only to vehicles such as electric vehicles and hybrid electric vehicles but also to IT products.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery pack, comprising:
a plurality of battery modules stacked in a first direction;
a tray including an interior space where the plurality of battery modules are positioned;
a plurality of beam frames traversing an upper surface of the tray to partition spaces where the plurality of battery modules are positioned; and
a plurality of heatsinks having a hollow structure through which a coolant flows,
wherein each heatsink is coupled to a part of a respective one of the plurality of beam frames and faces a side surface of a respective one of the plurality of battery modules facing the first direction to be between the plurality of battery modules,
wherein at least one drainage hole is provided at the tray and at least one drainage hole is provided in one beam frame of the plurality of beam frames,
wherein the at least one drainage hole of the tray is aligned with the at least one drainage hole of the beam frame, and
wherein the at least one drainage hole of the tray and the at least one drainage hole of the beam frame are provided below the heatsink.

2. The battery pack according to claim 1, wherein each beam frame of the plurality of beam frames comprises a drainage path having a concave shape.

3. The battery pack according to claim 2, wherein the at least one drainage hole of the tray is a plurality of drainage holes and the at least one drainage hole of the beam frame is a plurality of drainage holes, and
wherein the plurality of drainage holes of the tray and the plurality of drainage holes of the beam frame are provided along the drainage paths at predetermined intervals.

4. The battery pack according to claim 3, wherein each drainage path is inclined in at least one direction.

5. The battery pack according to claim 1, wherein a first part of the plurality of beam frames are I-type beam frames and each I-type beam frame has a column and recessed portions formed at both sides of the column, and
wherein each heatsink is mounted to a respective recessed portion of a respective I-type beam frame.

6. The battery pack according to claim 5, wherein each heatsink has a shape corresponding to a shape of the respective recessed portion and is adhered to the respective recessed portion by a thermal conductive adhesive.

7. The battery pack according to claim 5, wherein a second part of the plurality of beam frames, different from the first part, is a single center frame that traverses a center position of the tray, and the I-type beam frames intersect the center frame and are disposed on the tray at regular intervals, and
wherein the plurality of battery modules are arranged in a 2×N matrix.

8. The battery pack according to claim 7, wherein each of the heatsinks has an input port and an output port provided respectively at a first end and a second end of the heatsink to provide coolant flow through the heatsink, and wherein the input port and the output port traverses the upper surface of the tray along the respective I-type beam frame through the center frame.

9. The battery pack according to claim 8, further comprising:
a pack cover covering the upper surface of the tray and two side frames covering both side surfaces of the tray, respectively,
wherein the two side frames are provided in the form of a manifold tube communicating with the input ports and the output ports of the heatsinks to form a path for supplying and discharging the coolant.

10. The battery pack according to claim 7, wherein the center frame is in the form of an angled tube having a plurality of holes formed at an outer side surface of the center frame, and
wherein a connecting module is provided in the center frame to connect the plurality of battery modules in series and/or in parallel.

11. The battery pack according to claim 1, wherein a part of the plurality of beam frames is an angled beam frame with a hollow therein, and
wherein each heatsink is located inside a respective angled beam frame.

12. The battery pack according to claim 1, further comprising:
a heat conduction medium interposed at a thermal interface between each heatsink and the respective battery module.

13. The battery pack according to claim 12, wherein each heat conduction medium has a plate surface attached to one surface of the heatsink and at least one protrusion extending from the plate surface, and
wherein the at least one protrusion elastically deforms when an external pressure is applied thereto.

14. The battery pack according to claim 13, wherein each heat conduction medium is made of a silicon rubber.

15. The battery pack according to claim 1, wherein each of the plurality of battery modules has a bottom wall, a top wall and a plurality of side walls,
wherein the bottom wall contacts the upper surface of the tray, and
wherein electrode terminals extend from one of the plurality of side walls.

16. An electric vehicle, comprising the battery pack defined in claim 1.

* * * * *